United States Patent
Malladi et al.

(10) Patent No.: US 8,655,396 B2
(45) Date of Patent: Feb. 18, 2014

(54) METHODS AND APPARATUS FOR POWER ALLOCATION AND/OR RATE SELECTION FOR UL MIMO/SIMO OPERATIONS WITH PAR CONSIDERATIONS

(75) Inventors: Durga Prasad Malladi, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 726 days.

(21) Appl. No.: 12/444,575

(22) PCT Filed: Nov. 6, 2007

(86) PCT No.: PCT/US2007/083814
§ 371 (c)(1),
(2), (4) Date: Jul. 2, 2009

(87) PCT Pub. No.: WO2008/058143
PCT Pub. Date: May 15, 2008

(65) Prior Publication Data
US 2010/0029320 A1 Feb. 4, 2010

Related U.S. Application Data

(60) Provisional application No. 60/864,573, filed on Nov. 6, 2006.

(51) Int. Cl.
H04B 7/00 (2006.01)
H04L 23/02 (2006.01)

(52) U.S. Cl.
USPC .............. 455/522; 455/13.4; 455/23; 455/42; 455/450; 455/509; 375/261; 375/225

(58) Field of Classification Search
None
See application file for complete search history.

(56) References Cited

U.S. PATENT DOCUMENTS 6,393,276 B1 5/2002 Vanghi
6,639,911 B1 10/2003 Bingham
(Continued)

FOREIGN PATENT DOCUMENTS

EP 1353452 A2 10/2003
JP 2003179657 A 6/2003
(Continued)

OTHER PUBLICATIONS

Partial International Search Report—PCT/US07/083814, International Search Authority—European Patent Office—Apr. 15, 2008.

(Continued)

*Primary Examiner* — Yuwen Pan
*Assistant Examiner* — Fanghwa Wang
(74) *Attorney, Agent, or Firm* — Nerrie M. Zohn

(57) ABSTRACT

A method for a wireless communication includes receiving or storing a peak to average (PAR) back off value; and applying the PAR back off value to determine the transmission power and rate for SIMO and MIMO transmissions. In one aspect, the PAR back off value is at least partially based on modulation type. In another aspect, the PAR back off value is more for higher order QAM than for QPSK. The power allocation algorithm for different UL MIMO schemes is described as follows. For MIMO without antenna permutation (e.g. per antenna rate control), different PAR back off values are considered for different data streams. For MIMO with antenna permutation or other unitary transformation such as virtual antenna mapping or precoding, the PAR back off are determined based on combined channel. The transmission data rate depends on power and also the receiver algorithms such as a MMSE receiver or MMSE-SIC receiver.

14 Claims, 12 Drawing Sheets

(56) References Cited

U.S. PATENT DOCUMENTS

| | | | |
|---|---|---|---|
| 7,536,198 B1* | 5/2009 | Wu et al. | 455/522 |
| 8,041,315 B2* | 10/2011 | Hamalainen et al. | 455/127.1 |
| 2005/0283715 A1 | 12/2005 | Sutivong et al. | |
| 2006/0030352 A1* | 2/2006 | Kiran et al. | 455/522 |
| 2006/0057978 A1* | 3/2006 | Love et al. | 455/127.1 |
| 2006/0153062 A1 | 7/2006 | Tanabe et al. | |
| 2006/0155534 A1 | 7/2006 | Lin et al. | |
| 2006/0205357 A1* | 9/2006 | Kim | 455/69 |
| 2006/0209754 A1 | 9/2006 | Ji et al. | |
| 2006/0209764 A1 | 9/2006 | Kim et al. | |
| 2006/0293076 A1* | 12/2006 | Julian et al. | 455/522 |
| 2007/0004465 A1* | 1/2007 | Papasakellariou et al. | 455/571 |
| 2007/0081604 A1* | 4/2007 | Khan et al. | 375/261 |
| 2007/0129024 A1 | 6/2007 | Kikuma | |
| 2009/0252247 A1* | 10/2009 | Lee et al. | 375/267 |

FOREIGN PATENT DOCUMENTS

| | | |
|---|---|---|
| JP | 2003258927 A | 9/2003 |
| JP | 2006211649 A | 8/2006 |
| JP | 2007158913 A | 6/2007 |
| RU | 2238611 C1 | 10/2004 |
| RU | 2264036 | 11/2005 |
| WO | WO0176098 A2 | 10/2001 |
| WO | 2004077664 | 9/2004 |
| WO | 2004109950 | 12/2004 |
| WO | WO2006049669 | 5/2006 |
| WO | 2006116704 | 11/2006 |

OTHER PUBLICATIONS

International Search Report and Written Opinion—PCT/US07/083814, International Search Authority—European Patent Office—Jun. 19, 2008.

Written Opinion—PCT/US2007/083814, International Search Authority, European Patent Office, Jun. 19, 2008.

Taiwan Search Report—TW096141948—TIPO—Aug. 13, 2011.

Qualcomm Europe: "TP on Link Analysis for DL Shared Channel for Single User MIMO", 3GPP TSG-RAN WG1#45 R1-061527, URL:http://www.3gpp.org/ftp/tsg_ran/WG1_RL1/TSGR1_45/Docs/R1-061527.zip. (May 8, 2006-May 12, 2006).

* cited by examiner

METHODS AND APPARATUS FOR POWER ALLOCATION AND/OR RATE SELECTION FOR UL MIMO/SIMO OPERATIONS WITH PAR CONSIDERATIONS

CROSS-REFERENCE TO RELATED APPLICATIONS

This application claims the benefit of U.S. Provisional Patent application Ser. No. 60/864,573 entitled "A METHOD AND APPARATUS FOR POWER ALLOCATION AND RATE SELECTION FOR UL MIMO/SIMO OPERATIONS WITH PAR CONSIDERATIONS" which was filed Nov. 6, 2006. The entirety of the aforementioned application is herein incorporated by reference.

BACKGROUND

I. Field

The following description relates generally to wireless communications, and more particularly to providing a mechanism for power adjustments.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out (MISO), or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into Ns independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel.

In a wireless communication system, a Node B (or base station) may transmit data to a user equipment (UE) on the downlink and/or receive data from the UE on the uplink. The downlink (or forward link) refers to the communication link from the Node B to the UE, and the uplink (or reverse link) refers to the communication link from the UE to the Node B. The Node B may also send control information (e.g., assignments of system resources) to the UE. Similarly, the UE may send control information to the Node B to support data transmission on the downlink and/or for other purposes.

For open loop MIMO systems, the transmitter does not know the MIMO channel conditions. The optimum power allocation is then uniform distribution of power along all transmit antennas. With limited feedback, such as per stream supportable rate, rate adaptation along with minimum mean square error (MMSE) detection and successive interference cancellation (SIC, collectively MMSE-SIC) a receiver can be proven to be capacity achieving schemes. This is the basis for PARC (per antenna rate control) system. Alternative MIMO schemes involve layer permutation, which effectively equalize the four spatial channels. Because the layer permutation is a unitary transformation, one can easily show that this scheme is also capacity achieving. In fact, this is the basis for VAP (virtual antenna permutation). In both of these schemes, equal power allocation is used at the transmitter.

For upload or uplink (UL) MIMO transmission, however, equal power allocation is no longer feasible because of the constraints of the peak to average ratio considerations. Transmitting the same maximum power from all transmit antennas may drive some amplifier(s) into their non-linear region and lead to high signal distortion

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with an aspect, a method for a wireless communication system includes receiving a peak to average (PAR) back off value; and applying the received PAR back off value to determine a power value such as a power allocation (PA) value. In accordance with one aspect, the PAR back off value is at least partially based on modulation type. In another aspect, the method includes determining a rate for a UL transmission. In another aspect, the PAR back off value is at least partially based on modulation type and is more for 64 QAM than for QPSK. The power allocation algorithm for different UL MIMO schemes is described as follows. Power allocations (PA) without antenna permutation (e.g. per antenna rate control PARC): When allocating power for different antenna stream, one can consider different PAR back off value for different modulation schemes. Different PA back off should be applied for different modulations, such as QPSK and 16 QAM. Therefore, if different layers use different modulation order, the power allocations will be different. Power allocations with antenna permutation (e.g. virtual access point VAP): If the same modulation order is chosen for different layers, the PA back off can be chosen according to the back off factor for that modulation order. If different modulation order is chosen, then the PA back off can be chosen based on the PAR back off value from the permuted streams.

In an aspect, the rate determination algorithm with PAR considerations is describes as follows. In one aspect, a centralized rate determination controlled by a Node B scheduler is considered. A channel quality index (CQI) from one antenna is power controlled as a reference signal. Channel conditions from other antennas can be derived base on either broadband pilot from all antennas or the special design of a request channel. In other words, the MIMO channel sounding is achieved by either periodically sending broadband pilots from all antennas or by sending the request channel from different antennas. The broadband pilot symbols may be utilized by the access terminals to generate channel quality information (CQI) regarding the channels between the access terminal and the access point for the channel between each transmit antenna that transmits symbols and receive antenna that receives these symbols. In an embodiment, the channel estimate may constitute noise, signal-to-noise ratios, pilot signal power, fading, delays, path-loss, shadowing, correlation, or any other measurable characteristic of a wireless communication channel. The UE reports delta power spectral density (PSD) with respect to the reference signal within the headroom adjusted by the load indicator with consideration of the path differentials from serving and other sectors. To be consistent with SIMO operations, one can report back the delta PSD for the antenna transmitting the CQI signal. PA back off with the PAR consideration can be determined by assuming a QPSK transmission. The Node-B uses this reported delta PSD to calculate the data rate of the user who does not suffer from an inter-user interference (e.g., the last decoded user in the SIC operation). If the selected modulation is higher than QPSK, additional back off should be applied, and supportable rate is recalculated. The Node-B can calculate the data rates of the users who suffer from the inter-user interference based on post-SIC effective signal to noise ratio (SNR). If the modulation order is higher than QPSK, additional back off can be applied and supportable rates are recalculated in accordance with an aspect.

In general some central ideas include a) apply different transmission powers and PAR back offs depend on at least modulation orders for SIMO as well as MIMO users, and b) the transmission powers for each of the MIMO streams as well as the supportable rates of different streams also depends on various MIMO transformations such as per antenna rate control, antenna permutation, or other unitary transformation such as virtual antenna mapping.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
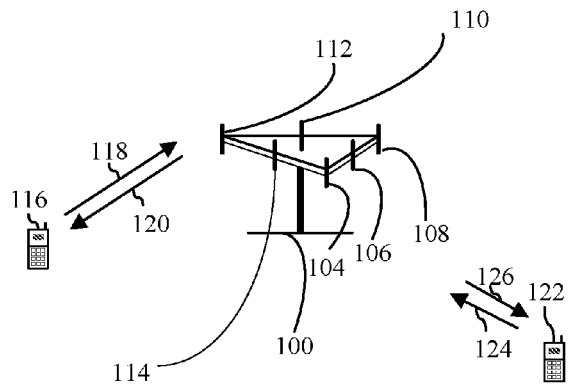
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In accordance with an aspect, a method for a wireless communication system includes receiving a peak to average (PAR) back off value; and applying the received PAR back off value to determine a power value. In accordance with one aspect, the PAR back off values is at least partially based on modulation type. In another aspect, the method includes determining a rate for a UL transmission. In another aspect, the PAR back off value is at least partially based on modulation type and is more for 64 QAM than for QPSK. The power allocation algorithm for different UL MIMO schemes is described as follows. Power allocations PA without antenna permutation (e.g. per antenna rate control PARC): When allocating power for different antenna stream, one can consider different PAR back off value for different modulation schemes. Different PA back off can be applied for different modulations, such as QPSK and 16 QAM. Therefore, if different layers use different modulation order, the power allocations will be different. Power allocations with antenna permutation (e.g. virtual access point VAP): If the same modulation order is chosen for different layers, the PA back off can be chosen according to the back off factor for that modulation order. If different modulation order is chosen, then the PA back off can be chosen based on the PAR back off value from the permuted streams.

In an aspect, the rate determination algorithm with PAR back off value considerations is describes as follows. In one aspect, a centralized rate determination controlled by a Node B scheduler is considered. A channel quality index CQI from one antenna is power controlled as a reference signal. Channel conditions from other antennas can be derived base on either broadband pilot from all antennas or the special design of request channel. In other words, the MIMO channel sounding is achieved by either periodically sending broadband pilots from all antennas or by sending the request channel from different antennas. The broadband pilot symbols may be utilized by the access terminals to generate channel quality information (CQI) regarding the channels between the access terminal and the access point for the channel between each transmit antenna that transmits symbols and receive antenna that receives these symbols. In an embodiment, the channel estimate may constitute noise, signal-to-noise ratios, pilot signal power, fading, delays, path-loss, shadowing, correlation, or any other measurable characteristic of a wireless communication channel. The UE reports delta power spectral density (PSD) with respect to the reference signal within the headroom adjusted by the load indicator with consideration of the path differentials from serving and other sectors. To be consistent with SIMO operations, one can report back the delta PSD for the antenna transmitting the CQI signal. PA back off with the PAR back off value consideration can be determined by assuming a QPSK transmission. The Node-B uses this reported delta PSD to calculate the data rate of the user who does not suffer from an inter-user interference (e.g., the last decoded user in the SIC operation). If the selected modulation is higher than QPSK, then additional back off can be applied, and a supportable rate is recalculated. Node-B calculates the data rates of the users who suffer from the inter-user interference based on post-SIC effective signal to noise ratio (SNR). If the modulation order is higher than QPSK, additional back off can be applied and supportable rates are recalculated in accordance with an aspect. By back off it is meant to be any amount less than the full amount available.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems, and apparatuses described herein are descried in the context of an ad-hoc or unplanned/semi-planned deployed wireless communication environment that provides a repeating ACK channel in an orthogonal system. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels, and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event(s) and data source(s).

The transmission reinforcing techniques described herein may be used for various wireless communication systems such as CDMA, TDMA, FDMA, OFDMA, and single-carrier frequency division multiplexing (SC-FDMA) systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). Cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDMO, etc. These various radio technologies and standards are known in the art.

UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). Cdma2000 is described in documents from an organization named "3rd Generation Partnership Project 16" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods. The LTE downlink transmission scheme is partitioned by radio frames (e.g. 10 ms radio frame). Each frame comprises a pattern made of frequency (e.g. sub-carrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more sub-carrier and one or more OFDM symbol. One or more resource blocks may be used for transmission of data, control information, pilot, or any combination thereof.

A multicast/broadcast single-frequency network or MBSFN is a broadcast network where several transmitters simultaneously send the same signal over the same frequency channel. Analog FM and AM radio broadcast networks as well as digital broadcast networks can operate in this manner. Analog television transmission has proven to be more difficult, since the MBSFN results in ghosting due to echoes of the same signal.

A simplified form of MBSFN can be achieved by a low power co-channel repeater, booster, or broadcast translator, which is utilized as gap filler transmitter. The aim of SFNs is efficient utilization of the radio spectrum, allowing a higher number of radio and TV programs in comparison to traditional multi-frequency network (MFN) transmission. An MBSFN may also increase the coverage area and decrease the outage probability in comparison to an MFN, since the total received signal strength may increase to positions midway between the transmitters.

MBSFN schemes are somewhat analogous to what in non-broadcast wireless communication, for example cellular networks and wireless computer networks, is called transmitter macrodiversity, CDMA soft handoff and Dynamic Single Frequency Networks (DSFN). MBSFN transmission can be considered as a severe form of multipath propagation. The radio receiver receives several echoes of the same signal, and the constructive or destructive interference among these echoes (also known as self-interference) may result in fading. This is problematic especially in wideband communication and high-data rate digital communications, since the fading in that case is frequency-selective (as opposed to flat fading), and since the time spreading of the echoes may result in intersymbol interference (ISI). Fading and ISI can be avoided by means of diversity schemes and equalization filters.

In wideband digital broadcasting, self-interference cancellation is facilitated by the OFDM or COFDM modulation method. OFDM uses a large number of slow low-bandwidth modulators instead of one fast wide-band modulator. Each modulator has its own frequency sub-channel and sub-carrier frequency. Since each modulator is very slow, one can afford to insert a guard interval between the symbols, and thus eliminate the ISI. Although the fading is frequency-selective over the whole frequency channel, it can be considered as flat within the narrowband sub-channel. Thus, advanced equalization filters can be avoided. A forward error correction code (FEC) can counteract that a certain portion of the sub-carriers are exposed to too much fading to be correctly demodulated.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. Access terminals 116 and 122 can be UEs. In a FDD system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beam forming in order to improve the signal-to-noise ratio of forward links for the different access terminals 116 and 124. Also, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal, or some other terminology.

Figure 2:
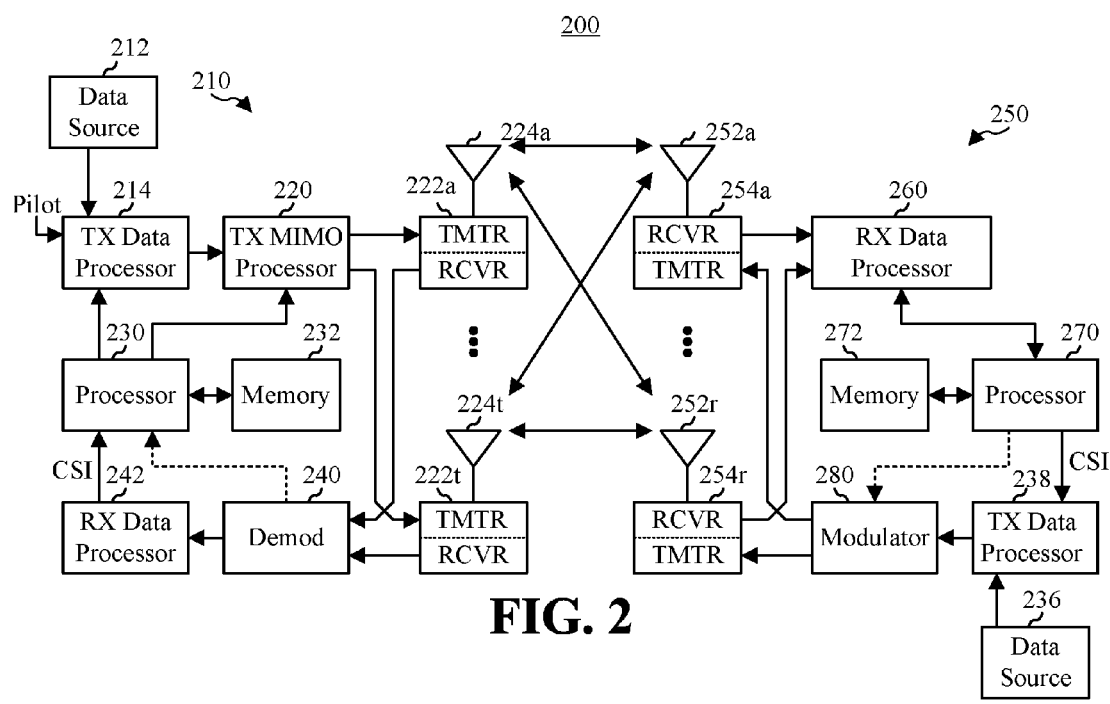
FIG. 2 is a block diagram of an embodiment of a transmitter system (also known as the access point) and a receiver system (also known as access terminal) in a MIMO system in accordance with one or more aspects.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using FORM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BASK, ASK, M-PSF, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, de-interleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam forming weights then processes the extracted message.

In an aspect, logical channels are classified into Control Channels and Traffic Channels. Logical Control Channels comprises Broadcast Control Channel (BCCH) that is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) that is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH), and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)

Shared DL Control Channel (SDCCH)

Multicast Control Channel (MCCH)

Shared UL Assignment Channel (SUACH)

Acknowledgement Channel (ACKCH)

DL Physical Shared Data Channel (DL-PSDCH)

UL Power Control Channel (UPCCH)

Paging Indicator Channel (PICH)

Load Indicator Channel (LICH)

The UL PHY Channels comprises:

Physical Random Access Channel (PRACH)

Channel Quality Indicator Channel (CQICH)

Acknowledgement Channel (ACKCH)

Antenna Subset Indicator Channel (ASICH)

Shared Request Channel (SREQCH)

UL Physical Shared Data Channel (UL-PSDCH)

Broadband Pilot Channel (BPICH)

In an aspect, a channel structure is provided that preserves low signal peak to average (PAR) values, and at any given time, the channel is contiguous or uniformly spaced in frequency that is a desired property of a single carrier waveform.

Figure 3:
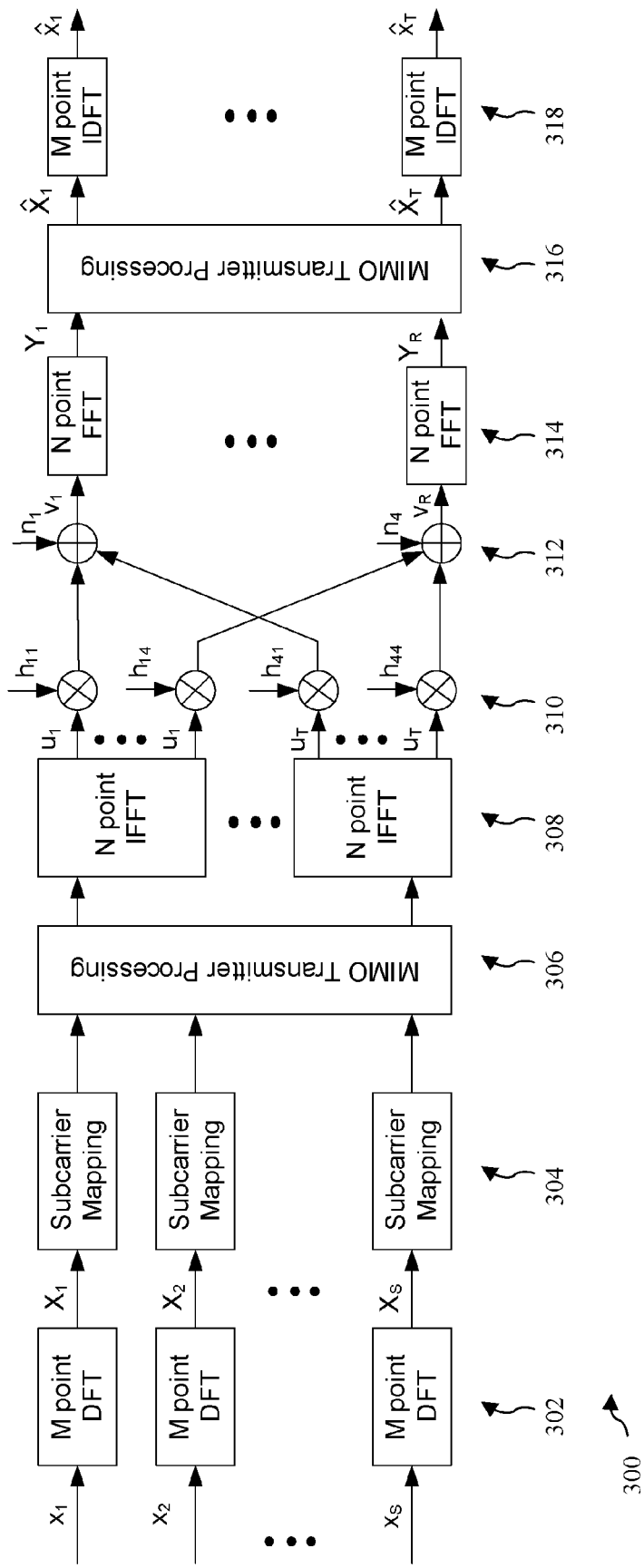
FIG. 3 illustrates a UL MIMO Transceiver Block Diagram in accordance with one or more aspects.

FIG. 3 illustrates a UL MIMO Transceiver Block Diagram 300 showing a plurality of M point DFT blocks 302 where discrete fast Fourier transforms (FFT) are performed and a plurality of Subcarrier Mapping blocks 304 where subcarrier mapping takes place. A MIMO Transmitter processing is illustrated at block 306. A plurality of N point IFFT blocks are at 308 where inverse FFT takes place, and two sets of nodes 310 and 312 are positioned between the N point Inverse FFT blocks 308 and a plurality of N point FFT blocks 314 where FFT takes place. A MIMO Transmitter processing is illustrated at block 316 and a plurality of M point IDFT blocks are at 318 where inverse DFT can take place.

For SC-FDM, the transmitted signals are generated in time domain and converted into frequency domain through an M point discrete Fourier transform (DFT) operation. For OFDM, the DFT blocks 302 are bypassed. To focus on the impact of MIMO operations, one can consider only LFDM for SC-FDM, which is most relevant to UL data transmissions. The simulations can be easily extended to include inverse fast Fourier transform demodulation (IFDM) if such need arises. For MIMO operations, one can consider different types of permutation patterns for both OFDM and LFDM: 1. MIMO transmission without antenna permutation. 2. MIMO transmission with symbol level permutation: the transmitted streams are permuted on a symbol bases during each of the Transmission Time Interval, (TTI). By symbol level permutation, it is meant the transmitted streams are permuted for each of the six LFDM symbols within the 0.5 ms slot of the E-UTRA uplink transmission. For simplicity, presented are simulation results for 2×2 MIMO only. However, extension to 4×4 is trivial. For MIMO transmissions, one can consider two streams of the same or different modulation orders. Based on the current LTE E-UTRA specifications, QPSK and 16 QAM are chosen as the UL modulation order. So for the two transmit antenna case, it is very likely to have 16 QAM as the modulation order for the one stream, while QPSK as the other. Or, in some cases, 16 QAM for both streams. If one extends the current MCS to include 64 QAM, then one may also have combinations of 64 QAM with QPSK or 16 QAM. In this application, one can consider the following three cases with mixed modulation orders.

TABLE 1

Modulation Order for 2 × 2 MIMO UL PAR Simulations

|  | First Stream | Second Stream |
| --- | --- | --- |
| Case 1 | 16 QAM | QPSK |
| Case 2 | 64 QAM | QPSK |
| Case 3 | 64 QAM | 16 QAM |

The fast Fourier transform (FFT) size considered is $N_{fft}=512$ and the DFT size considered is $N_{dft}=100$ tones. A total of $N_{guard}=212$ tones guard tones are inserted symmetrically on both sides of the 300 data tones. Finally, localized frequency tones are mapped into the first $N_{dft}$ data tone locations. Typically the PAR backoffs are such that 64 QAM>16 QAM>QPSK.

Figure 4:
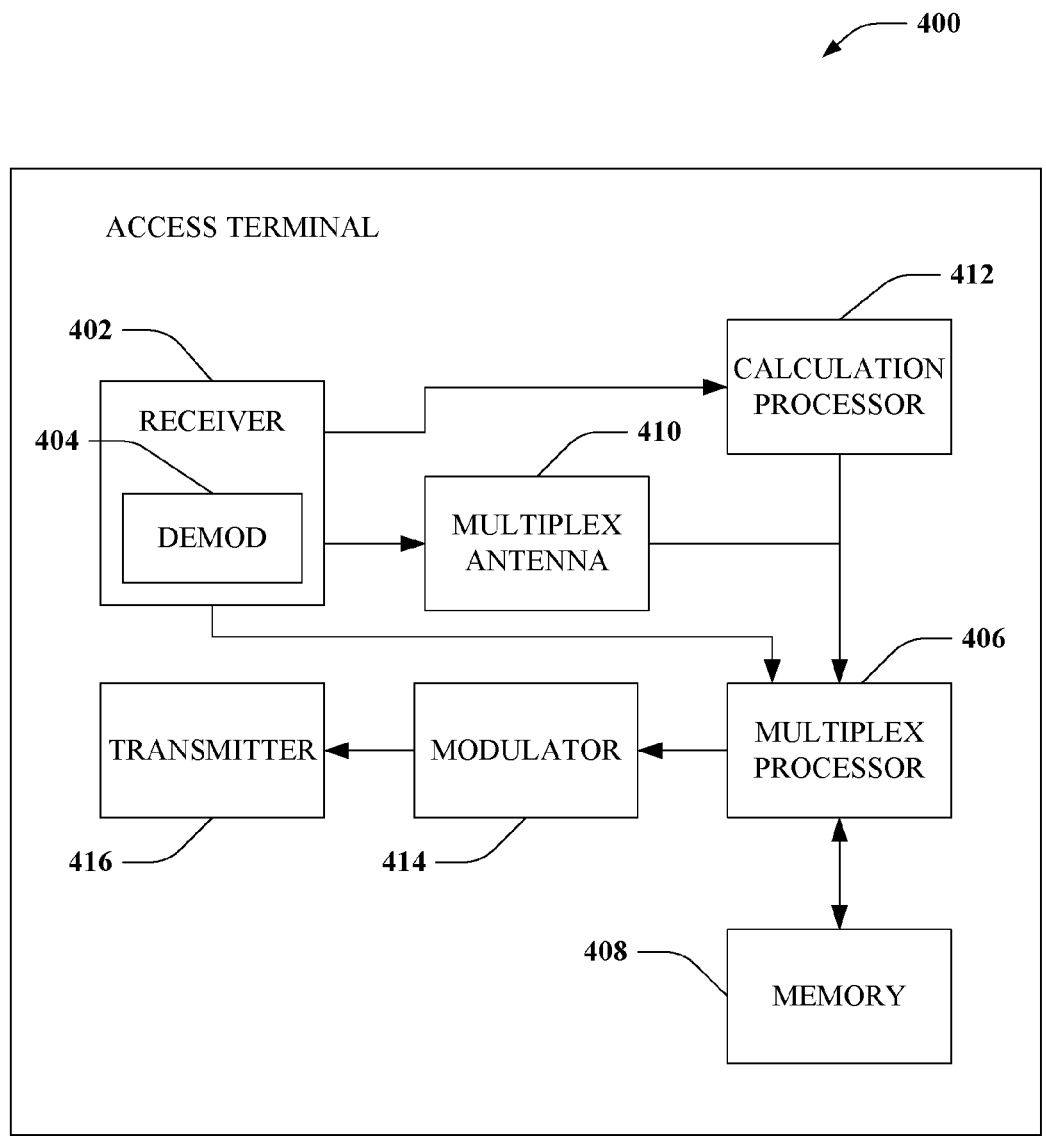
FIG. 4 depicts an exemplary access terminal that can provide feedback to communications networks, in accordance with one or more aspects.

FIG. 4 depicts an exemplary access terminal 400 that can provide feedback to communications networks, in accordance with one or more aspects of the herein described PAR back off and/or PA back off. Access terminal 400 comprises a receiver 402 (e.g., an antenna) that receives a signal and performs typical actions on (e.g., filters, amplifies, down converts, etc.) the received signal. Specifically, receiver 402 can also receive a service schedule defining services apportioned to one or more blocks of a transmission allocation period, a schedule correlating a block of downlink resources with a block of uplink resources for providing feedback information as described herein, or the like. Receiver 402 can comprise a demodulator 404 that can demodulate received symbols and provide them to a processor 406 for evaluation. Processor 406 can be a processor dedicated to analyzing information received by receiver 402 and/or generating information for transmission by a transmitter 416. Additionally, processor 406 can be a processor that controls one or more components of access terminal 400, and/or a processor that analyzes information received by receiver 402, generates information for transmission by transmitter 416, and controls one or more components of access terminal 400. Additionally, processor 406 can execute instructions for interpreting a correlation of uplink and downlink resources received by receiver 402, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 400 can additionally comprise memory 408 that is operatively coupled to processor 406 and that may store data to be transmitted, received, and the like. Memory 408 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 of the subject systems and methods is intended to comprise, without being limited to, these and any other suitable types of memory.

Receiver 402 is further operatively coupled to multiplex antenna 410 that can receive a scheduled correlation between one or more additional blocks of downlink transmission resources and a block of uplink transmission resources. A multiplex processor 406 can be provided. Further, a calculation processor 412 can receive a feedback probability function, wherein the function limits a probability that a feedback message is provided by access terminal 400, as described herein, if the block of downlink transmission resources, or data associated therewith, is not received.

Access terminal 400 still further comprises a modulator 414 and a transmitter 416 that transmits the signal to, for instance, a base station, an access point, another access terminal, a remote agent, etc. Although depicted as being separate from the processor 406, it is to be appreciated that signal generator 410 and indicator evaluator 412 may be part of processor 406 or a number of processors (not shown).

While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 5:
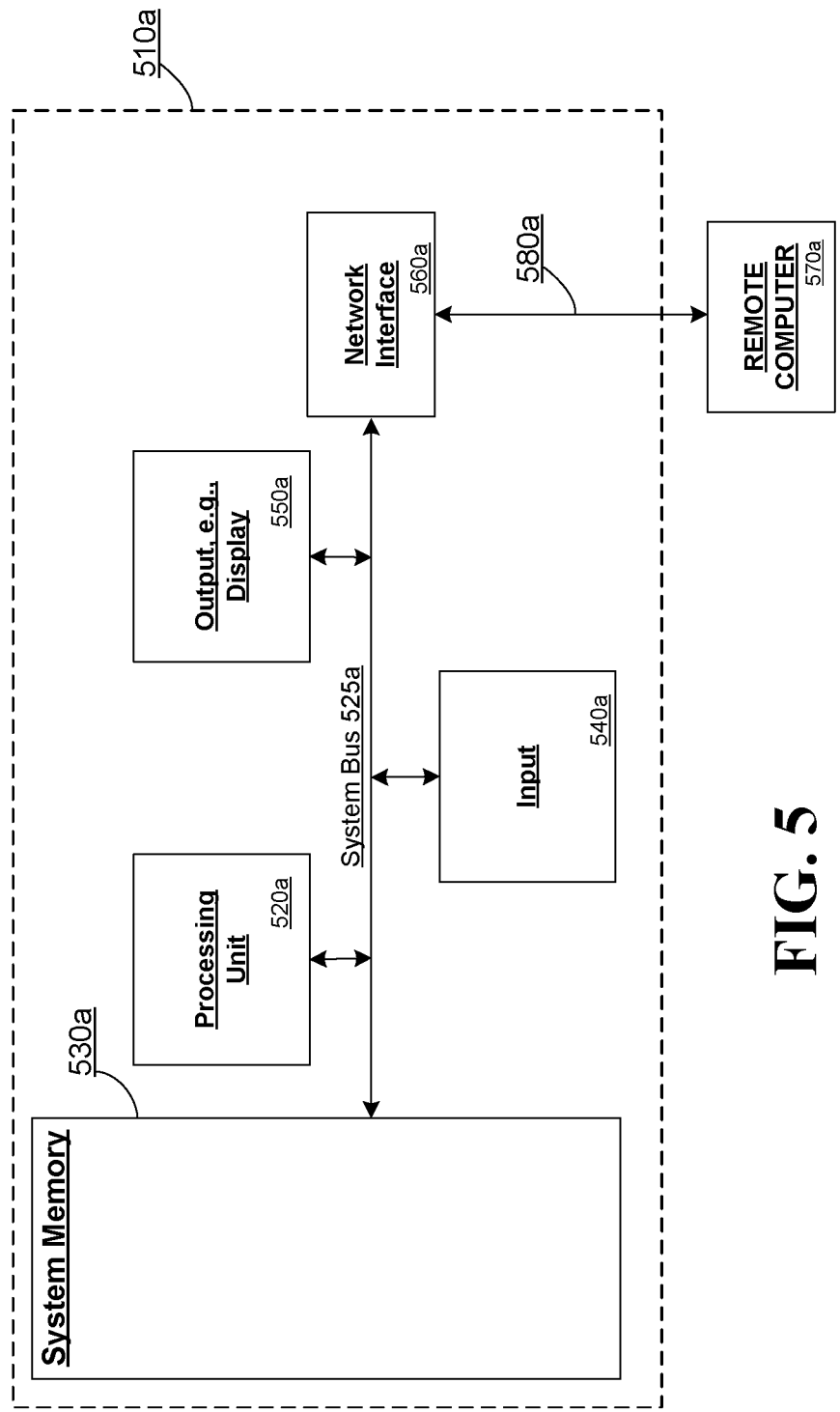
FIG. 5 illustrates an example of a suitable computing system environment in accordance with one or more aspects.

FIG. 5 illustrates an example of a suitable computing system environment 500a in which the innovation can be implemented, although as made clear above, the computing system environment 500a is only one example of a suitable computing environment and is not intended to suggest any limitation as to the scope of use or functionality of the innovation. Neither should the computing environment 500a be interpreted as having any dependency or requirement relating to any one or combination of components illustrated in the exemplary operating environment 500a.

With reference to FIG. 5, an exemplary remote device for implementing at least one generalized non-limiting embodiment includes a general purpose computing device in the form of a computer 510a. Components of computer 510a can include, but are not limited to, a processing unit 520a, a system memory 530a, and a system bus 525a that couples various system components including the system memory to the processing unit 520a. The system bus 525a can be any of several types of bus structures including a memory bus or memory controller, a peripheral bus, and a local bus using any of a variety of bus architectures.

Computer 510a typically includes a variety of computer readable media that can store modulation based PA and/or PAR back off values. Computer readable media can be any available media that can be accessed by computer 510a. By way of example, and not limitation, computer readable media can comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510a. Communication media typically embodies computer readable instructions, data structures, program modules, or other data in a modulated data signal such as a carrier wave or other transport mechanism and includes any information delivery media.

The system memory 530a can include computer storage media in the form of volatile and/or non-volatile memory such as read only memory (ROM) and/or random access memory (RAM). A basic input/output system (BIOS), containing the basic routines that help to transfer information between elements within computer 510a, such as during start-up, can be stored in memory 530a. Memory 530a typically also contains data and/or program modules that are immediately accessible to and/or presently being operated on by processing unit 520a. By way of example, and not limitation, memory 530a can also include an operating system, application programs, other program modules, and program data.

The computer 510a can also include other removable/non-removable, volatile/non-volatile computer storage media. For example, computer 510a could include a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 525*a* through a non-removable memory interface such as an interface, and a magnetic disk drive or optical disk drive is typically connected to the system bus 525*a* by a removable memory interface, such as an interface.

A user can enter commands and information into the computer 510*a* through input devices such as a keyboard and pointing device, commonly referred to as a mouse, trackball or touch pad. Other input devices can include a microphone, joystick, game pad, satellite dish, scanner, or the like. These and other input devices are often connected to the processing unit 520*a* through user input 540*a* and associated interface(s) that are coupled to the system bus 525*a*, but can be connected by other interface and bus structures, such as a parallel port, game port or a universal serial bus (USB). A graphics subsystem can also be connected to the system bus 525*a*. A monitor or other type of display device is also connected to the system bus 525*a* via an interface, such as output interface 550*a*, which can in turn communicate with video memory. In addition to a monitor, computers can also include other peripheral output devices such as speakers and a printer, which can be connected through output interface 550*a*.

The computer 510*a* can operate in a networked or distributed environment using logical connections to one or more other remote computers, such as remote computer 570*a*, which can in turn have media capabilities different from device 510*a*. The remote computer 570*a* can be a personal computer, a server, a router, a network PC, a peer device or other common network node, or any other remote media consumption or transmission device, and can include any or all of the elements described above relative to the computer 510*a*. The logical connections depicted in FIG. 5 include a network 580*a*, such local area network (LAN) or a wide area network (WAN), but can also include other networks/buses. Such networking environments are commonplace in homes, offices, enterprise-wide computer networks, intranets, and the Internet.

When used in a LAN networking environment, the computer 510*a* is connected to the LAN 580*a* through a network interface or adapter. When used in a WAN networking environment, the computer 510*a* typically includes a communications component, such as a modem, or other means for establishing communications over the WAN, such as the Internet. A communications component, such as a modem, which can be internal or external, can be connected to the system bus 525*a* via the user input interface of input 540*a*, or other appropriate mechanism. In a networked environment, program modules depicted relative to the computer 510*a*, or portions thereof, can be stored in a remote memory storage device. It will be appreciated that the network connections shown and described are exemplary and other means of establishing a communications link between the computers can be used.

Figure 6:
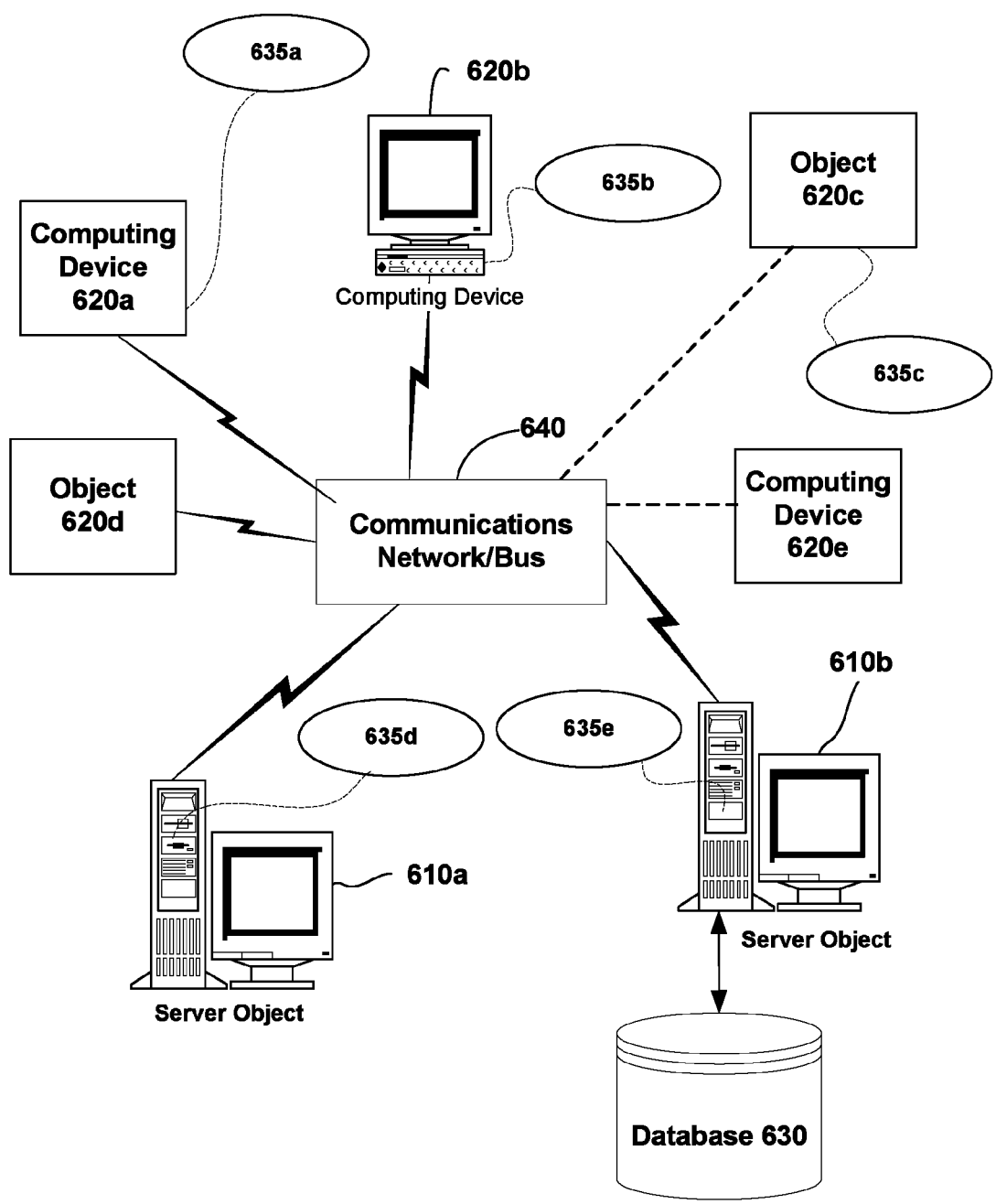
FIG. 6 provides a schematic diagram of an exemplary networked or distributed computing environment in which PAR backing off can be employed in accordance with one or more aspects.

FIG. 6 provides a schematic diagram of an exemplary networked or distributed computing environment in which PAR backing off and/or PA backing off can be employed. The distributed computing environment comprises computing objects 610*a*, 610*b*, etc. and computing objects or devices 620*a*, 620*b*, 620*c*, 620*d*, 620*e*, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 640. This network can itself comprise other computing objects and computing devices that provide services to the system of FIG. 6, and can itself represent multiple interconnected networks. In accordance with an aspect of at least one generalized non-limiting embodiment, each object 610*a*, 610*b*, etc. or 620*a*, 620*b*, 620*c*, 620*d*, 620*e*, etc. can contain an application that might make use of an application programming interface (API), or other object, software, firmware and/or hardware, suitable for use with the design framework in accordance with at least one generalized non-limiting embodiment.

It can also be appreciated that an object, such as 620*c*, can be hosted on another computing device 610*a*, 610*b*, etc. or 620*a*, 620*b*, 620*c*, 620*d*, 620*e*, etc. Thus, although the physical environment depicted can show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to optimization algorithms and processes according to the present innovation.

In home networking environments, there are at least four disparate network transport media that can each support a unique protocol, such as Power line, data (both wireless and wired), voice (e.g., telephone) and entertainment media. Most home control devices such as light switches and appliances can use power lines for connectivity. Data Services can enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. All of these network environments and others that can emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the present innovation can share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 6, as an example, computers 620a, 620b, 620c, 620d, 620e, etc. can be thought of as clients and computers 610a, 610b, etc. can be thought of as servers where servers 610a, 610b, etc. maintain the data that is then replicated to client computers 620a, 620b, 620c, 620d, 620e, etc., although any computer can be considered a client, a server, or both, depending on the circumstances. Any of these computing devices can be processing data or requesting services or tasks that can implicate the optimization algorithms and processes in accordance with at least one generalized non-limiting embodiment.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the optimization algorithms and processes of at least one generalized non-limiting embodiment can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

Thus, FIG. 6 illustrates an exemplary networked or distributed environment, with server(s) in communication with client computer (s) via a network/bus, in which the herein described PAR backing off can be employed. In more detail, a number of servers 610a, 610b, etc. are interconnected via a communications network/bus 640, which can be a LAN, WAN, intranet, GSM network, the Internet, etc., with a number of client or remote computing devices 620a, 620b, 620c, 620d, 620e, etc., such as a portable computer, handheld computer, thin client, networked appliance, or other device, such as a VCR, TV, oven, light, heater and the like in accordance with the present innovation. It is thus contemplated that the present innovation can apply to any computing device in connection with which it is desirable to communicate data over a network.

In a network environment in which the communications network/bus 640 is the Internet, for example, the servers 610a, 610b, etc. can be Web servers with which the clients 620a, 620b, 620c, 620d, 620e, etc. communicate via any of a number of known protocols such as HTTP. Servers 610a, 610b, etc. can also serve as clients 620a, 620b, 620c, 620d, 620e, etc., as can be characteristic of a distributed computing environment.

As mentioned, communications can be wired or wireless, or a combination, where appropriate. Client devices 620a, 620b, 620c, 620d, 620e, etc. can or cannot communicate via communications network/bus 640, and can have independent communications associated therewith. For example, in the case of a TV or VCR, there can or cannot be a networked aspect to the control thereof. Each client computer 620a, 620b, 620c, 620d, 620e, etc. and server computer 610a, 610b, etc. can be equipped with various application program modules or objects 635a, 635b, 635c, etc. and with connections or access to various types of storage elements or objects, across which files or data streams can be stored or to which portion(s) of files or data streams can be downloaded, transmitted or migrated. Any one or more of computers 610a, 610b, 620a, 620b, 620c, 620d, 620e, etc. can be responsible for the maintenance and updating of a database 630 or other storage element, such as a database or memory 630 for storing data processed or saved according to at least one generalized non-limiting embodiment. Thus, the present innovation can be utilized in a computer network environment having client computers 620a, 620b, 620c, 620d, 620e, etc. that can access and interact with a computer network/bus 640 and server computers 610a, 610b, etc. that can interact with client computers 620a, 620b, 620c, 620d, 620e, etc. and other like devices, and databases 630.

Figure 7:
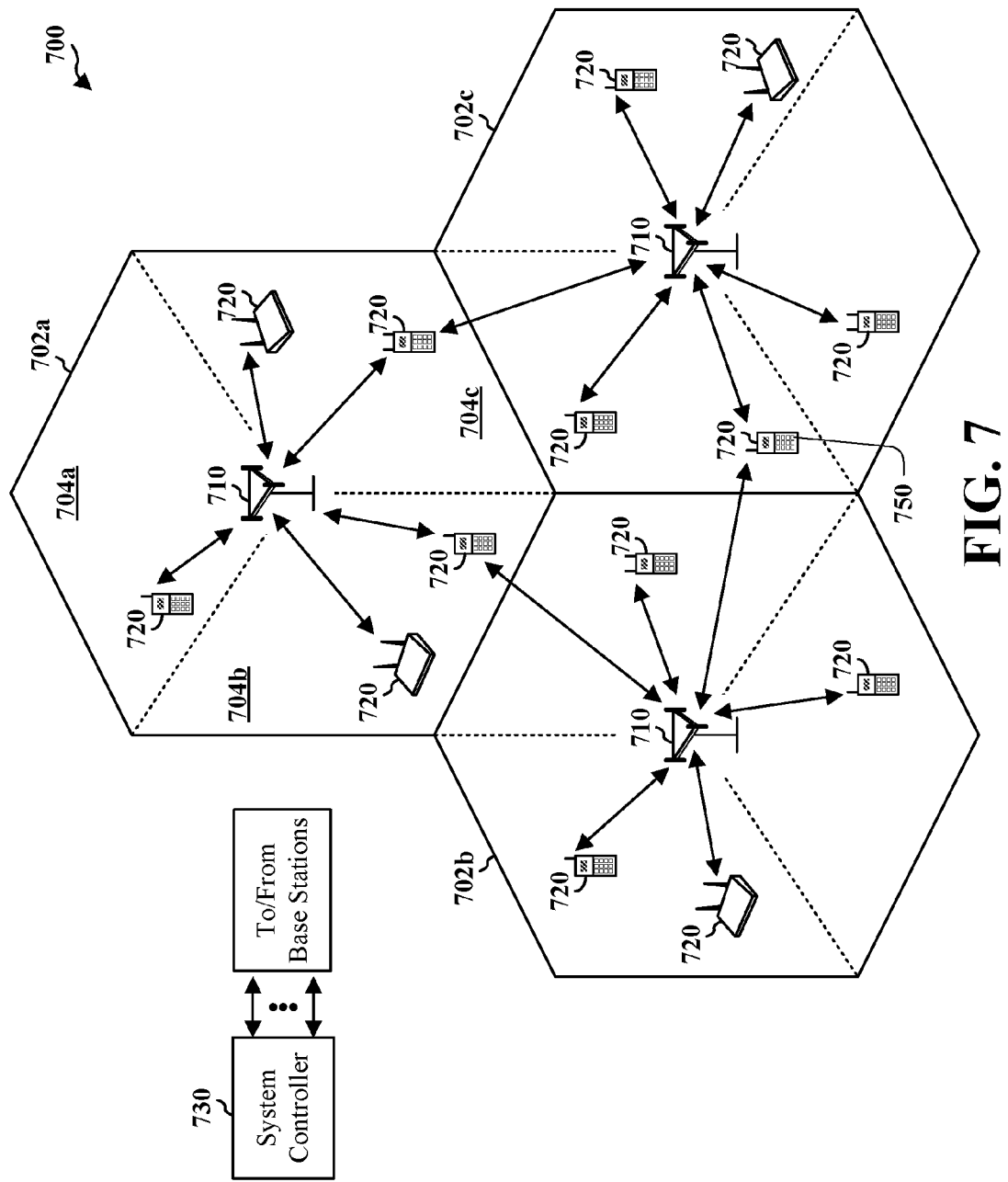
FIG. 7 illustrates a wireless communication system with multiple base stations and multiple terminals, such as may be utilized in conjunction with one or more aspects of the herein described PAR backing off.

FIG. 7 illustrates a wireless communication system 700 with multiple base stations 710 and multiple terminals 720, such as may be utilized in conjunction with one or more aspects of the herein described PAR backing off. A base station is generally a fixed station that communicates with the terminals and may also be called an access point, a Node B, or some other terminology. Each base station 710 provides communication coverage for a particular geographic area, illustrated as three geographic areas, labeled 702a, 702b, and 702c. The term "cell" can refer to a base station and/or its coverage area depending on the context in which the term is used. To improve system capacity, a base station coverage area may be partitioned into multiple smaller areas (e.g., three smaller areas, according to cell 702a in FIG. 7), 704a, 704b, and 704c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 720 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 720 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 730 couples to base stations 710 and provides coordination and control for base stations 710. For a distributed architecture, base stations 710 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 8:
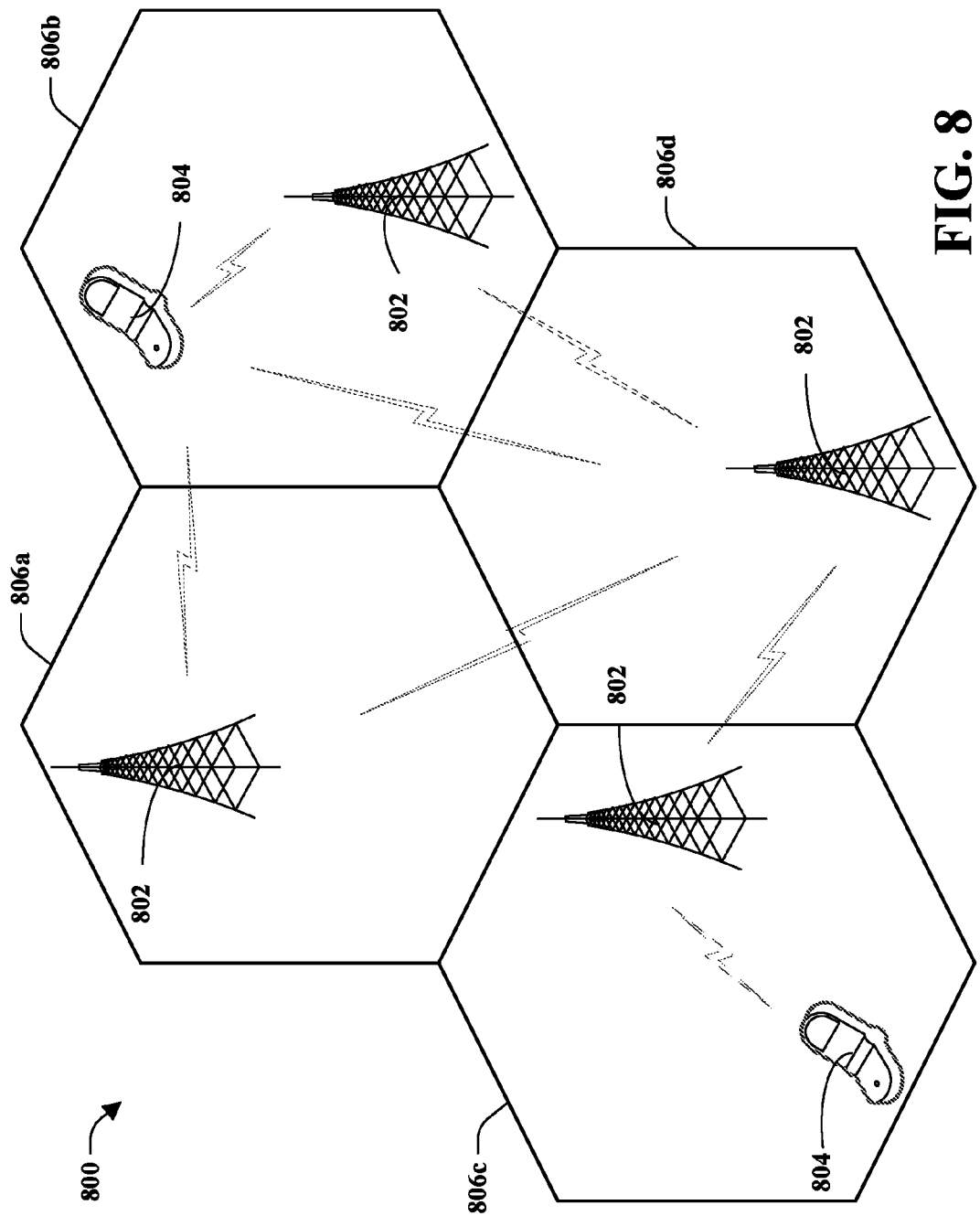
FIG. 8 is an illustration of an ad hoc or unplanned/semi-planned wireless communication environment in accordance with various aspects of the herein described PAR backing off.

FIG. 8 is an illustration of an ad hoc or unplanned/semi-planned wireless communication environment 800, in accordance with various aspects of the herein described PAR backing off. System 800 can comprise one or more base stations 802 in one or more sectors that receive, transmit, repeat, etc., wireless communication signals to each other and/or to one or more mobile devices 804. As illustrated, each base station 802 can provide communication coverage for a particular geographic area, illustrated as three geographic areas, labeled 806a, 806b, 806c, and 806d. Each base station 802 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 804 may be, for example, cellular phones, smart phones, laptops, handheld communication devices, handheld computing devices, satellite radios, global positioning systems, PDAs, and/or any other suitable device for communicating over wireless network 800. System 800 can be employed in conjunction with various aspects described herein in order for PAR back off to be implemented successfully in one exemplary non-limiting embodiment.

Figure 9:
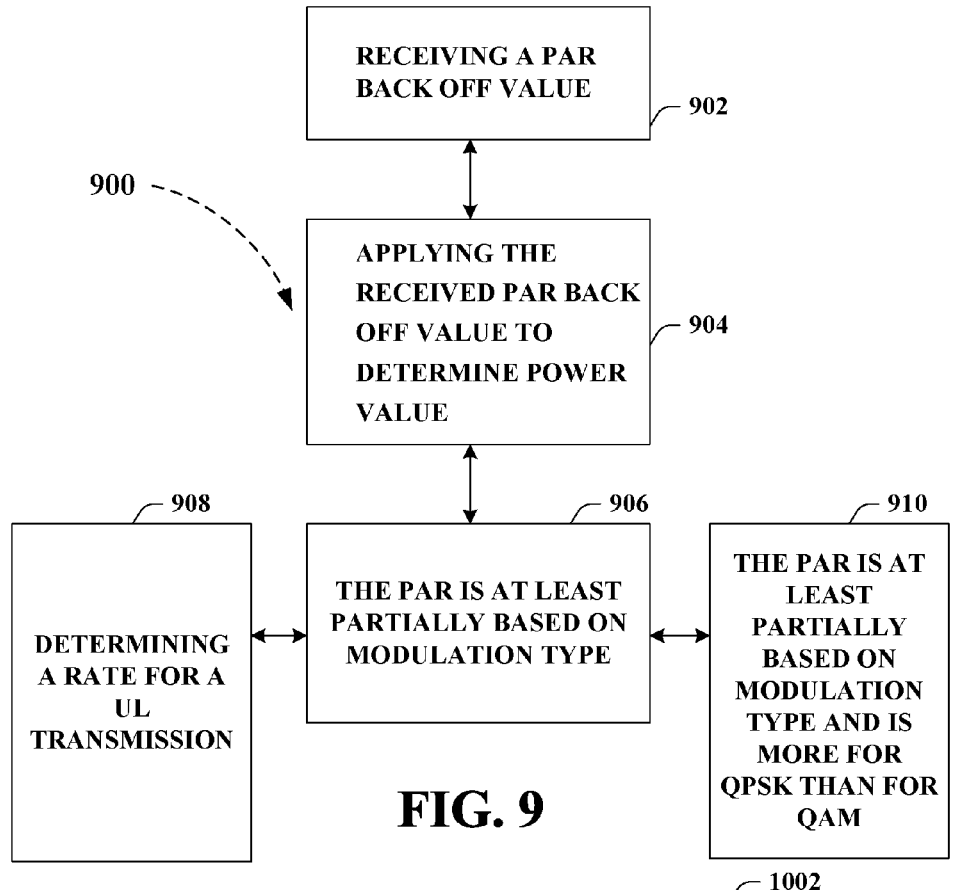
FIG. 9 illustrates a methodology including receiving a PAR back off value in accordance with one or more aspects.

FIG. 9 illustrates a methodology 900 including receiving a PAR back off value at 902. At 904 is applying the received PAR back off value to determine a power value such as the PA. At 906 is that the PAR back off value is at least partially based on the modulation type. At 908 is determining a rate for a UL transmission. At 910 is the PAR is at least partially based on modulation type and is more for QAM than for QPSK.

When the embodiments are implemented in software, firmware, middleware, or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The mobile device can be broadcasting to by employing a femtocell or a boomer cell. A femtocell was originally called an Access Point Base Station—and is a scalable, multi-channel, two-way communication device extending a typical base station by incorporating all of the major components of the telecommunications infrastructure. A typical example is a UMTS access point base station containing a Node-B, RNC, and GSN, with only an Ethernet or broadband connection (less commonly, ATM/TDM) to the Internet or an intranet. Application of VoIP allows such a unit to provide voice and data services in the same way as a normal base station, but with the deployment simplicity of a Wi-Fi access point. Other examples include CDMA-2000 and WiMAX solutions.

The main benefit of an Access Point Base Station is the simplicity of ultra low cost, scalable deployment. Design studies have shown that access point base stations can be designed to scale from simple hot-spot coverage through to large deployments by racking such units into full-scale basestations. The claimed attractions for a cellular operator are that these devices can increase both capacity and coverage while reducing both capex (Capital expenditures) and opex (Operating expenditures).

Access Point Base Stations are stand-alone units that are typically deployed in hot spots, in-building and even in-home. Variations include attaching a Wi-Fi router to allow a Wi-Fi hot-spot to work as backhaul for a cellular hotspot, or vice versa. Femtocells are an alternative way to deliver the benefits of Fixed Mobile Convergence. The distinction is that most FMC architectures require a new (dual-mode) handset, while a femtocell-based deployment will work with existing handsets.

As a result, Access Point Base Stations must work with handsets that are compliant with existing RAN technologies. The reuse of existing RAN technologies (and potentially re-use of existing frequency channels) could create problems, since the additional femtocell transmitters represent a large number of interference sources, potentially resulting in significant operational challenges for existing deployments. This is one of the biggest areas that femtocells must overcome if they are to be successful.

Access Point Base Stations typically rely on the Internet for connectivity, which can potentially reduce deployment costs but introduces security risks that generally do not exist in typical cellular systems. A boomer cell is a very big cell that would cover state sized area or larger.

Figure 10:
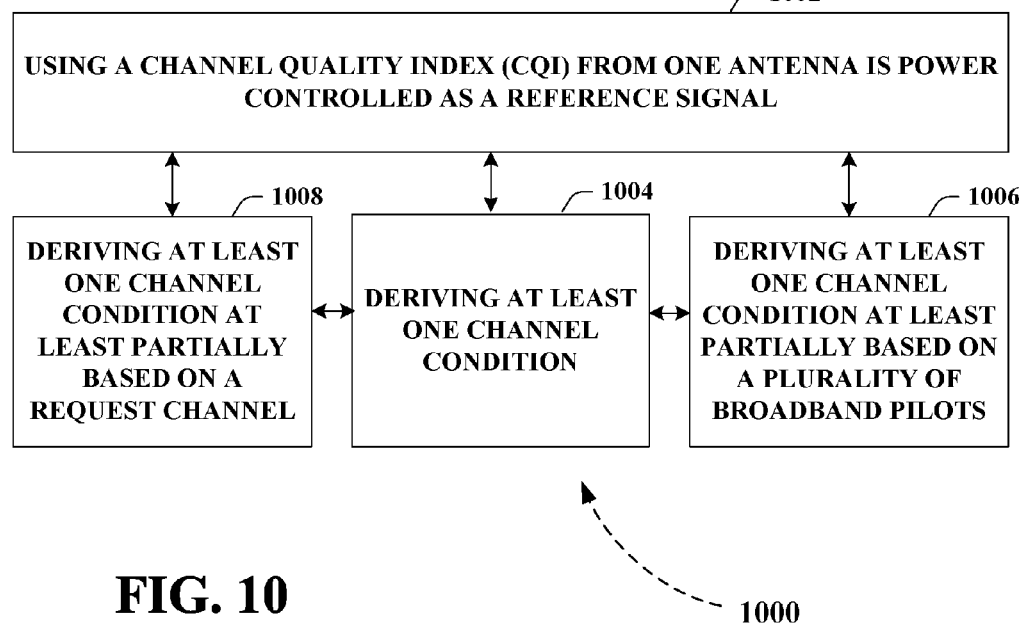
FIG. 10 illustrates a methodology 1000 wherein a channel quality index (CQI) from one antenna is power controlled as a reference signal in accordance with one or more aspects.

FIG. 10 illustrates a methodology 1000 wherein a channel quality index (CQI) from one antenna is power controlled as a reference signal at 1002. Deriving at least one channel condition is at 1004. Deriving at least one channel condition at least partially based on a plurality of broadband pilots is at 1006. Deriving at least one channel condition at least partially based on a request channel is at 1008. The decisions on what and how to derive can be made through the employ of an AI layer. In addition, in other embodiments with or without a security layer, cells can dynamically change derivations based at least partially on an AI decision. A sensor can provide feedback at to assist in that decision. For example, the sensor can determine network conditions at a specific time and alter the number and/or locations of interference.

Figure 11:
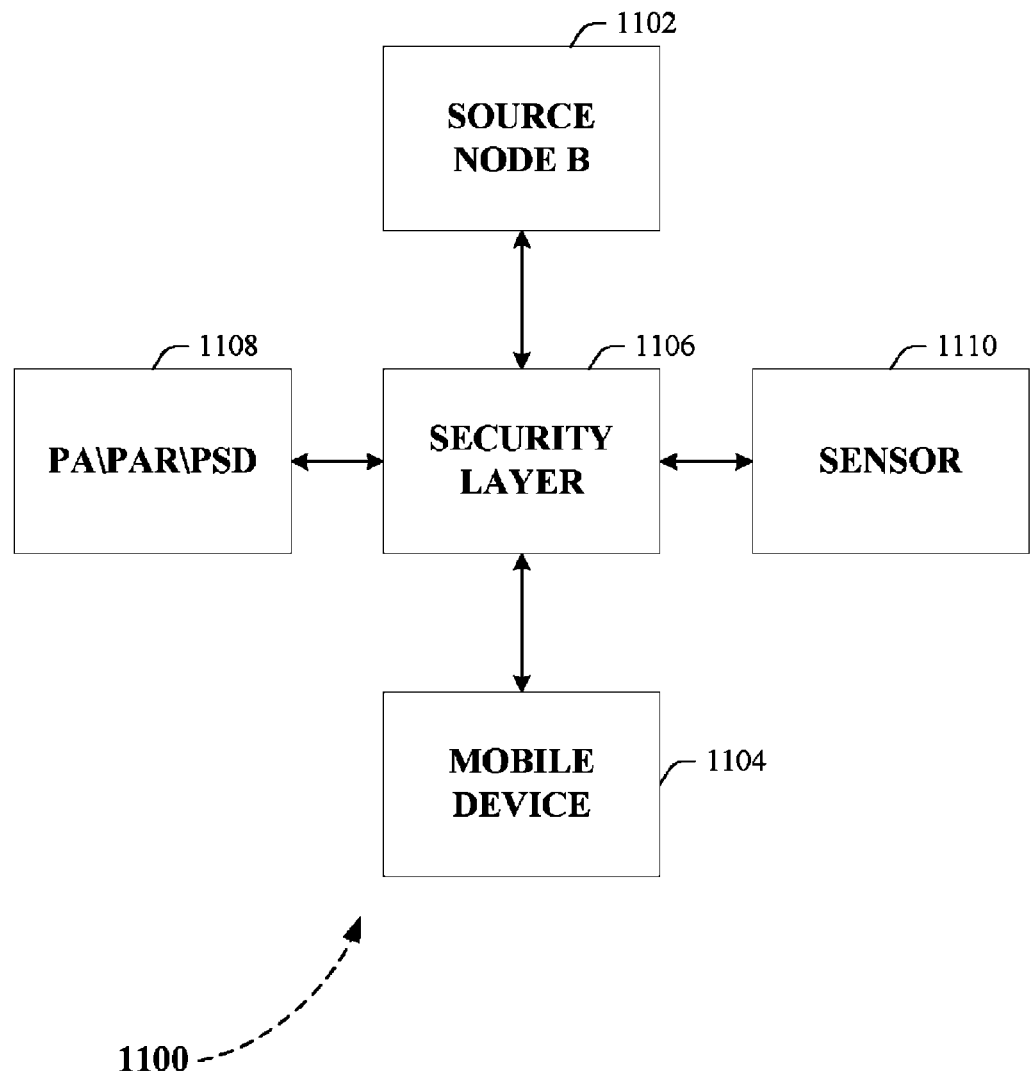
FIG. 11 illustrates a methodology wherein a source node B is in communication with a mobile device in accordance with one or more aspects.

FIG. 11 illustrates a methodology 1100 wherein a source node B is in communication with a mobile device at 1104. In one exemplary generalized non-limiting embodiment, the methodology 1000 includes employing a security layer at 1006. At 1108, at least one of a power allocation (PA), a Power to Average ratio (PAR), and a power spectral density (PSD) is dynamically altered or adjusted as described herein.

Because at least a portion of the communication between the device 1104 and the Node B are wireless, the security layer 1106 is provided in one exemplary generalized non-limiting embodiment. The security layer 1106 can be used to cryptographically protect (e.g., encrypt) data as well as to digitally sign data, to enhance security and unwanted, unintentional, or malicious disclosure. In operation, the security component or layer 1106 can communicate data to/from the node B 1102 and the mobile device 1104. A sensor 1110 is provided in one exemplary non-limiting embodiment.

An encryption component can be used to cryptographically protect data during transmission as well as while stored. The encryption component employs an encryption algorithm to encode data for security purposes. The algorithm is essentially a formula that is used to turn data into a secret code. Each algorithm uses a string of bits known as a 'key' to perform the calculations. The larger the key (e.g., the more bits in the key), the greater the number of potential patterns can be created, thus making it harder to break the code and descramble the contents of the data.

Most encryption algorithms use the block cipher method, which code fixed blocks of input that are typically from 64 to 128 bits in length. A decryption component can be used to convert encrypted data back to its original form. In one aspect, a public key can be used to encrypt data upon transmission to a storage device. Upon retrieval, the data can be decrypted using a private key that corresponds to the public key used to encrypt.

A signature component can be used to digitally sign data and documents when transmitting and/or retrieving from the device 1104. It is to be understood that a digital signature or certificate guarantees that a file has not been altered, similar to if it were carried in an electronically sealed envelope. The 'signature' is an encrypted digest (e.g., one-way hash function) used to confirm authenticity of data. Upon accessing the data, the recipient can decrypt the digest and also re-compute the digest from the received file or data. If the digests match, the file is proven to be intact and tamper free. In operation, digital certificates issued by a certification authority are most often used to ensure authenticity of a digital signature.

Still further, the security layer 1106 can employ contextual awareness (e.g., context awareness component) to enhance security. For example, the contextual awareness component can be employed to monitor and detect criteria associated with data transmitted to and requested from the device 1104. In operation, these contextual factors can be used to filter spam, control retrieval (e.g., access to highly sensitive data from a public network), or the like. It will be understood that, in aspects, the contextual awareness component can employ logic that regulates transmission and/or retrieval of data in accordance with external criteria and factors. The contextual awareness employment can be used in connection with an artificial intelligence (AI) layer.

The AI layer or component can be employed to facilitate inferring and/or determining when, where, how to dynamically vary the level of security and/or the amount of power value altering. Such inference results in the construction of new events or actions from a set of observed events and/or stored event data, whether or not the events are correlated in close temporal proximity, and whether the events and data come from one or several event(s) and data source(s).

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to prognose or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

Additionally the sensor 1110 can be employed in conjunction with the security layer 1106. Still further, human authentication factors can be used to enhance security employing sensor 1110. For instance, biometrics (e.g., fingerprints, retinal patterns, facial recognition, DNA sequences, handwriting analysis, voice recognition) can be employed to enhance authentication to control access of the storage vault. It will be understood that embodiments can employ multiple factor tests in authenticating identity of a user.

The sensor 1110 can also be used to provide the security layer 1106 with generalized non-human metric data, such as electromagnetic field condition data or predicted weather data etc. For example, any conceivable condition can be sensed for and security levels can be adjusted or determined in response to the sensed condition.

Figure 12:
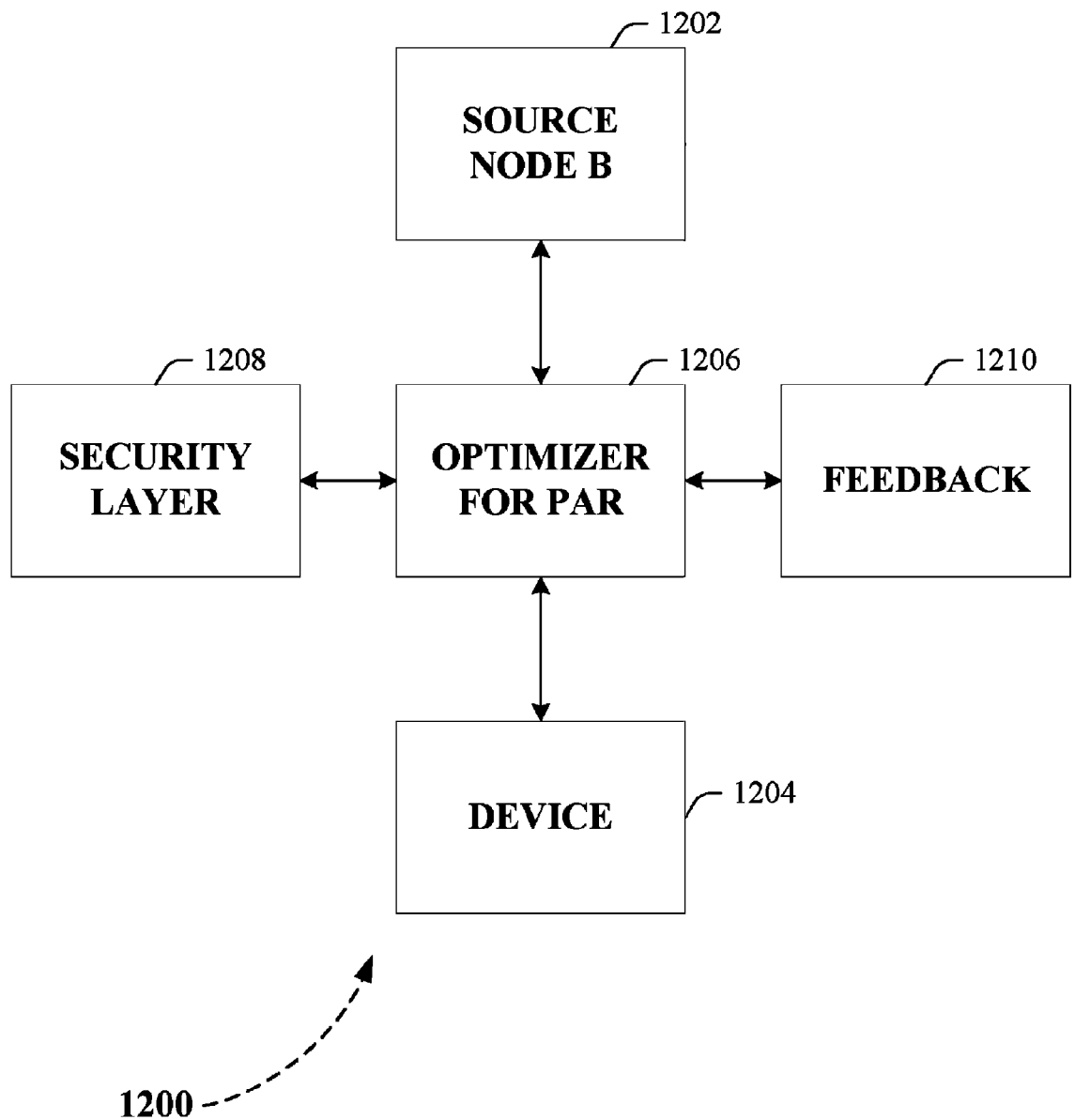
FIG. 12 illustrates an environment wherein a Node B such as a source Node B 1202 is in communication with a mobile device in accordance with one or more aspects.

FIG. 12 illustrates an environment 1200 wherein a Node B such as a source Node B 1202 is in communication with a mobile device at 1204. In one exemplary generalized non-limiting embodiment, the methodology 1200 includes employing an optimizer at 1206. The optimizer 1206 is provided to optimize communication between the Node B 1202 and device 1204. Optimizer 1206 optimizes or increases communication between the Node B 1202 and device 1204 by receiving security information from a security layer 1208. For example, when security layer 1208 informs optimizer 1206 that they are both in a secured environment, the optimizer 1206 balances this information with other information and may instruct the security layer 1208 to make all transmissions security free to achieve top speed. Additionally, a feedback layer or component 1210 can provide feedback as to missed data packets or other information to provide feedback to the optimizer 1206. This feedback of missed packets can be balanced against desired security level to enable less secure but higher throughput data transfer if desired. Additionally the optimizer 1206 can keep records of interferences and different PAR back off schemes and adaptively select the best scheme under the current conditions.

As mentioned, the innovation applies to any device wherein it can be desirable to communicate data, e.g., to a mobile device. It should be understood, therefore, that handheld, portable and other computing devices and computing objects of all kinds are contemplated for use in connection with the present innovation, i.e., anywhere that a device can communicate data or otherwise receive, process or store data. Accordingly, the below general purpose remote computer described below in FIG. 11 is but one example, and the present innovation can be implemented with any client having network/bus interoperability and interaction. Thus, the present innovation can be implemented in an environment of networked hosted services in which very little or minimal client resources are implicated, e.g., a networked environment in which the client device serves merely as an interface to the network/bus, such as an object placed in an appliance.

Although not required, at least one generalized non-limiting embodiment can partly be implemented via an operating system, for use by a developer of services for a device or object, and/or included within application software that operates in connection with the component(s) of at least one generalized non-limiting embodiment. Software can be described in the general context of computer executable instructions, such as program modules, being executed by one or more computers, such as client workstations, servers, or other devices. Those skilled in the art will appreciate that the innovation can be practiced with other computer system configurations and protocols.

Figure 13:
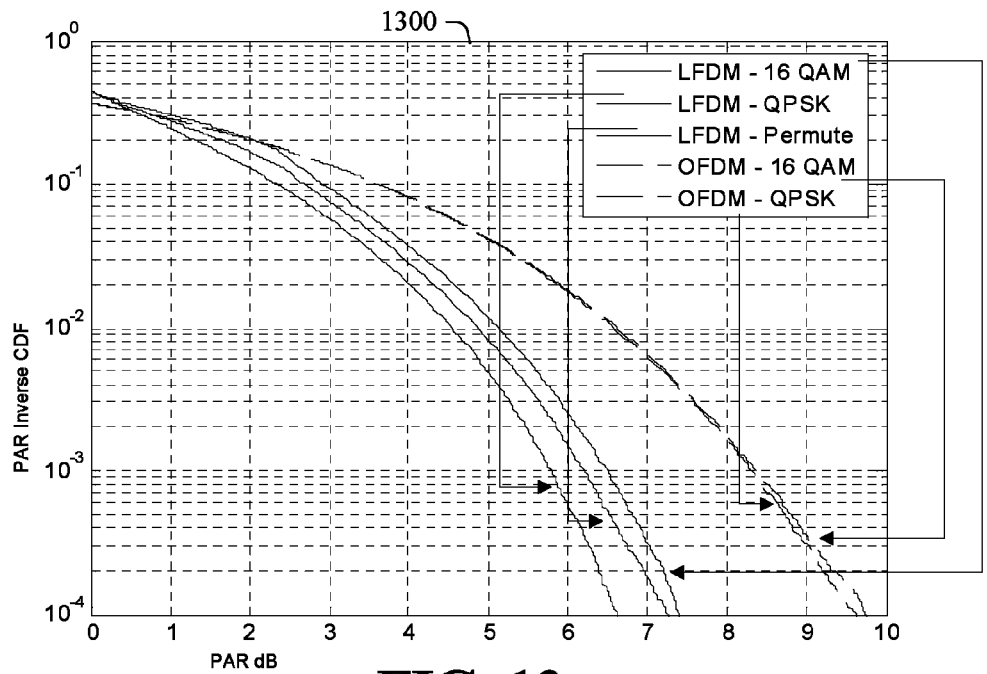
FIG. 13 illustrates PAR for LFDM for 16 QAM and QPSK in accordance with one or more aspects.
Figure 14:
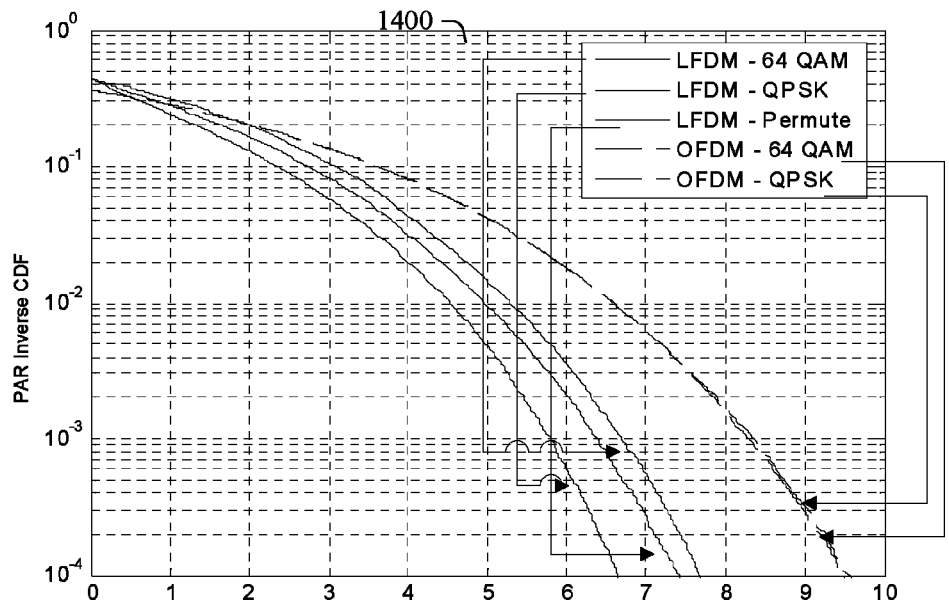
FIG. 14 illustrates PAR for LFDM for 64 QAM and QPSK in accordance with one or more aspects.
Figure 15:
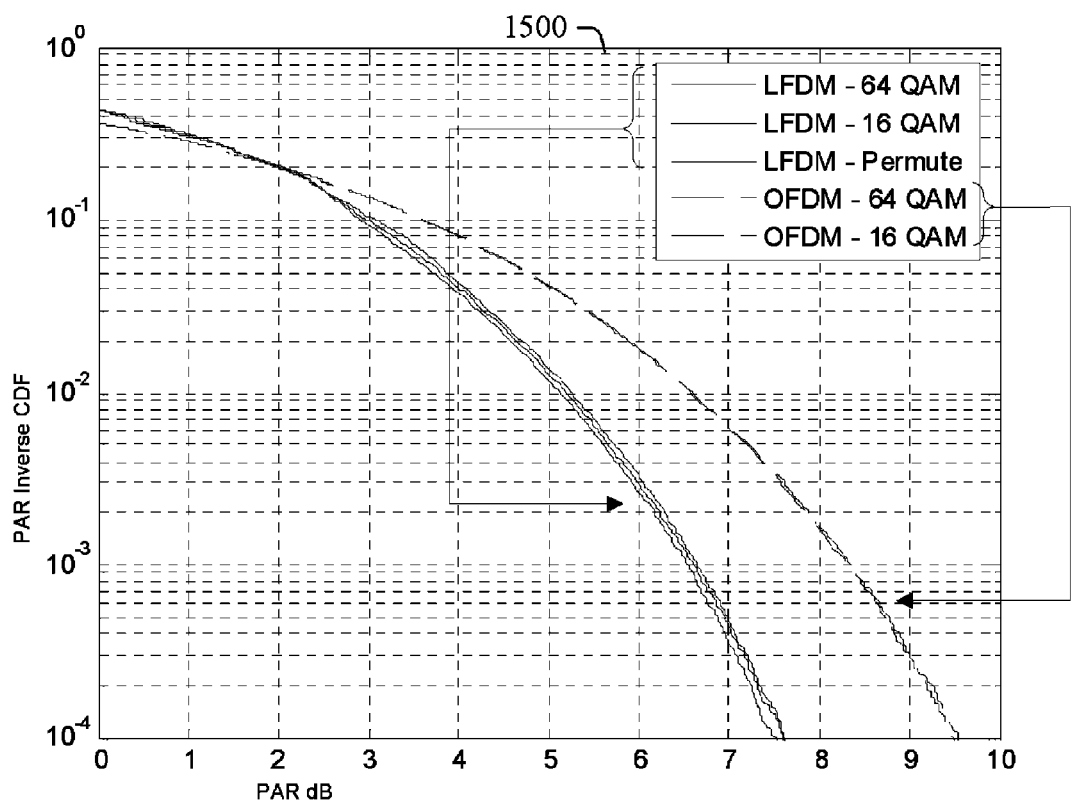
FIG. 15 illustrates PAR for LFDM for 64 QAM and 16 QAM in conjunction with one or more aspects.

FIGS. 13, 14, and 15 present the PAR simulation results for LFDM and OFDM with the modulation orders specified in Table 1, respectively at graphs 1300, 1400, and 1500. These results show that there is roughly 1 dB PAR difference between 64 QAM and QPSK, or 16 QAM and QPSK at the 99.9% PAR point for SC-FDM. The PAR difference between 64 QAM and 16 QAM is rather small. For localized OFDM, the difference in PAR is small for all modulations. This is a noticeable PAR reduction comparing LFDM to OFDM. The difference is roughly 2.5 dB for QPSK and 1.8 dB for 16 QAM and 64 QAM. FIG. 13 illustrates PAR for LFDM for 16 QAM and QPSK FIG. 14 illustrates PAR for LFDM for 64 QAM and QPSK, and FIG. 15 illustrates PAR for LFDM for 64 QAM and 16 QAM. For MIMO transmissions with PARC, the PAR difference between different streams can be larger than 1 dB. For MIMO transmission with antenna permutation such as VAP, the PAR is in between the PAR of two modulations with a bias towards the PAR of higher modulation order. Wherein higher-order modulation is a type of digital modulation usually with an order of 4 or higher. Examples: quadrature phase shift keying (QPSK), m-ary quadrature amplitude modulation (m-QAM), etc.

From the above descriptions, when the UE feedback the delta PSD for the Node B to schedule a certain rate, it has to be clear from both UE and Node B that certain PAR back off is considered. This is applicable not only for MIMO operations, but also for SIMO or SISO operations. For example, if the UE reports back the delta PSD assuming a PAR back off on a QPSK transmission, the Node B has to know the exact back off that was assumed. If Node B schedules a modulation coding scheme (MCS) with 16 QAM without PA back off adjustment, the scheduled rate will be higher than the UE can actually support. This will lead to unnecessary packet retransmission and loss in throughput.

To properly operate the system, it has to be explicitly defined in the standard specifications what PAR back off is assumed when the delta PSD is feedback from the UE to the Node B for both MIMO and SIMO operations. One such definition could be that UE should feedback the delta PSD assuming QPSK PAR back off, or assuming 16 QAM PAR back off. The scheduler chooses the MCS based on the delta PSD. If the modulation order is different from the assumed modulation order, the PAR difference needs to be taken into account and a different MCS may be chosen instead. The PAR difference for various modulations for SIMO and MIMO operations is specified above.

Herein described is the impact of PAR back off value in various MIMO schemes when LFDM is used for UL transmissions. There is considerable PAR difference for different modulation orders when no permutation is applied to MIMO layers such as PARC. If symbol level layer permutation is applied, such as selective virtual antenna permutation (S-VAP), the PAR of each layer is close to the average of the PARs of the layers before permutation.

Furthermore, in an aspect, for both SIMO and MIMO operations, it has to be specified in the standard what type of PAR back off is assumed when the UE reports back the delta PSD. Based on this information, the Node B will be able to appropriately apply the differential PAR back off and select the correct rate for UL transmission.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
reporting, by a user equipment (UE), channel quality information for a channel, the reporting associated with a first modulation scheme and a corresponding first peak to average power ratio (PAR) back off value; and
receiving scheduling information by the UE in response to the reporting, the scheduling information including a second modulation type associated with a second PAR back off value and a power allocation for the channel, the power allocation compensating for a difference between the first PAR backoff value and the second PAR back off value based on a difference between the first modulation scheme and the second modulation scheme.

2. The method of claim 1, in which the scheduling information further comprises a transmission rate based on the difference between the PAR back off value associated with the first modulation scheme and the PAR back off value associated with the second modulation scheme.

3. A method of wireless communication, comprising:
receiving a channel quality report of a channel, the channel quality report associated with a first modulation type and a corresponding first peak to average power ratio (PAR) back off value;
determining a second modulation type of the channel based on the channel quality report and the first PAR backoff value;
determining a second PAR backoff value associated with the second modulation type; and
transmitting scheduling information to a UE, the scheduling information including the second modulation type associated with the second PAR back off value and a power allocation, the power allocation compensating for a difference between the first PAR backoff value and the second PAR backoff value based on a difference between the first modulation scheme and the second modulation scheme.

4. The method of claim 3, in which the scheduling information further comprises a transmission rate for the channel based on a difference between the first PAR back off value associated with the first modulation scheme and the second PAR back off value associated with the second modulation scheme.

5. An apparatus for wireless communication, comprising:
means for reporting, by a user equipment (UE), channel quality information for a channel, the reporting associated with a first modulation scheme and a corresponding first peak to average power ratio (PAR) back off value; and
means for receiving scheduling information by the UE in response to the reporting, the scheduling information including a second modulation type associated with a second PAR back off value and a power allocation for the channel, the power allocation compensating for a difference between the first PAR backoff value and the second PAR back off value based on a difference between the first modulation scheme and the second modulation scheme.

6. The apparatus of claim 5, in which the scheduling information further comprises a transmission rate based on the difference between the PAR back off value associated with the first modulation scheme and the PAR back off value associated with the second modulation scheme.

7. An apparatus of wireless communication, comprising:
means for receiving a channel quality report of a channel, the channel quality report associated with a first modulation type and a corresponding first peak to average power ratio (PAR) back off value;
means for determining a second modulation type of the channel based on the channel quality report and the first PAR backoff value;
means for determining a second PAR backoff value associated with the second modulation type; and
means for transmitting scheduling information to a UE, the scheduling information including the second modulation type associated with the second PAR back off value and a power allocation, the power allocation compensating for a difference between the first PAR backoff value and second PAR backoff value based on a difference between the first modulation scheme and the second modulation scheme.

8. The apparatus of claim 7, in which the scheduling information further comprises a transmission rate for the channel based on a difference between the first PAR back off value associated with the first modulation scheme and the second PAR back off value associated with the second modulation scheme.

9. A computer program product for wireless communications stored on a non-transitory computer-readable medium and comprising program code for performing the steps of:
reporting, by a user equipment (UE), channel quality information for a channel, the reporting associated with a first modulation scheme and a corresponding first peak to average power ratio (PAR) back off value; and
receiving scheduling information by the UE in response to the reporting, the scheduling information including a second modulation type associated with a second PAR back off value and a power allocation for the channel, the power allocation compensating for a difference between the first PAR backoff value and the second PAR back off value based on a difference between the first modulation scheme and the second modulation scheme.

10. The computer program product of claim 9, in which the scheduling information further comprises a transmission rate based on the difference between the PAR back off value associated with the first modulation scheme and the PAR back off value associated with the second modulation scheme.

11. A computer program product for wireless communications stored on a non-transitory computer-readable medium and comprising program code for performing the steps of:
receiving a channel quality report of a channel, the channel quality report associated with a first modulation type and a corresponding first peak to average power ratio (PAR) back off value;
determining a second modulation type of the channel based on the channel quality report and the first PAR backoff value;
determining a second PAR backoff value associated with the second modulation type; and
transmitting scheduling information to a UE, the scheduling information including the second modulation type associated with the second PAR back off value and a power allocation, the power allocation compensating for a difference between the first PAR backoff value and the second PAR backoff value based on a difference between the first modulation scheme and the second modulation scheme.

12. The computer program product of claim 11, in which the scheduling information further comprises a transmission rate for the channel based on a difference between the first PAR back off value associated with the first modulation scheme and the second PAR back off value associated with the second modulation scheme.

13. An apparatus for wireless communication, comprising:
a memory; and
at least one processor coupled to the memory and configured for:
reporting, by a user equipment (UE), channel quality information for a channel, the reporting associated with a first modulation scheme and a corresponding first peak to average power ratio (PAR) back off value; and
receiving scheduling information by the UE in response to the reporting, the scheduling information including a second modulation type associated with a second PAR back off value and a power allocation for the channel, the power allocation compensating for a difference between the first PAR backoff value and the second PAR back off value based on a difference between the first modulation scheme and the second modulation scheme.

14. An apparatus of wireless communication, comprising:
a memory; and at least one processor coupled to the memory and configured for:
receiving a channel quality report of a channel, the channel quality report associated with a first modulation type and a corresponding first peak to average power ratio (PAR) back off value;
determining a second modulation type of the channel based on the channel quality report and the first PAR backoff value;
determining a second PAR backoff value associated with the second modulation type; and
transmitting scheduling information to a UE, the scheduling information including the second modulation type associated with the second PAR back off value and a power allocation, the power allocation compensating for a difference between the first PAR backoff value and the second PAR backoff value based on a difference between the first modulation scheme and the second modulation scheme.

* * * * *